United States Patent [19]

Wagner, Jr. et al.

[11] Patent Number: 5,138,616
[45] Date of Patent: Aug. 11, 1992

[54] CONTINUOUS ON-LINE LINK ERROR RATE DETECTOR UTILIZING THE FRAME BIT ERROR RATE

[75] Inventors: Charles F. Wagner, Jr., New Rochelle, N.Y.; James A. Coleman, Newtown, Pa.

[73] Assignee: The United States of America as represented by the Secretary of the Army, Washington, D.C.

[21] Appl. No.: 495,553

[22] Filed: Mar. 19, 1990

[51] Int. Cl.$^5$ .............................. G06F 11/30
[52] U.S. Cl. ....................... 371/5.1; 371/5.5
[58] Field of Search ............ 371/5.1, 5.5, 47.1, 371/5.2

[56] References Cited

U.S. PATENT DOCUMENTS

| | | | |
|---|---|---|---|
| 4,451,916 | 5/1984 | Casper et al. | 375/4 |
| 4,710,924 | 12/1987 | Chum | 371/5.1 |
| 4,796,257 | 1/1989 | Minoo | 371/5.1 |
| 4,849,972 | 7/1989 | Hackett et al. | 370/110.1 |
| 4,860,323 | 8/1989 | Malter | 375/111 |

FOREIGN PATENT DOCUMENTS 2617656 1/1989 France.

OTHER PUBLICATIONS

Hammer, A Microprocessor-Based Bit Error Performance Monitor, 1976 National Telecommunications Conference, Dec. 1976, pp. 30.6-1 to 30.6-4.
Rosenberg, Dictionary of Computers, Information Processing, and Telecommunications, 2nd Edition, ©1987, John Wiley & Sons.

*Primary Examiner*—Jerry Smith
*Assistant Examiner*—Henry C. Lebowitz
*Attorney, Agent, or Firm*—Michael Zelenka; Robert A. Maikis

[57] ABSTRACT

The framing bit errors of a received digital communications signal are monitored and recorded. The framing bit error rate is determined and an audible alarm is sounded when the error rate exceeds a predetermined threshold value in a plurality of calculation modes. The framing bit error rate and the total framing bit errors detected over a predetermined fixed time period is also displayed. A link to a remote network monitor can be implemented for monitoring and displaying framing bit error rate at a remote location.

1 Claim, 3 Drawing Sheets

CONTINUOUS ON-LINE LINK ERROR RATE DETECTOR UTILIZING THE FRAME BIT ERROR RATE

This invention may be made, used, sold and licensed by or for the Government for governmental purposes without the payment of any royalties to us thereon or therefor.

BACKGROUND OF THE INVENTION

This invention relates generally to communications apparatus and more particularly to apparatus for continuously monitoring, determining and displaying the error rate of a digital communications signal in a multi-channel radio link.

Time division multiplex (TDM) multi-channel communication systems or networks are well known. Such systems are particularly useful in digital communication systems utilizing a frame pattern which consists of a plurality of binary signal bits which appear in a continuous data stream. In order to distinguish each frame in the data stream, one bit referred to as the framing bit, typically appears at the end of the frame and exhibits a predetermined same digital pattern unless there are errors in the data stream. Accordingly, the purpose of the framing bit is to provide a marker in the digital stream so that electronic hardware can identify the location of each frame. It is necessary for the communications hardware to know the end of a frame because the data position within the frame must be sorted and transferred to different destinations.

Accordingly, it is an object of the present invention to improve the quality, maintainability and operability of time division multiplex communication systems without interruption or interference to the communications channels and without sacrificing channel capacity.

It is another object of the invention to assist personnel responsible for the set up, maintenance and operation of time division multiplex communications networks.

It is yet another object of the invention to provide maintenance personnel with a low cost, portable, non-intrusive instrument for measuring and trouble shooting time division multiplex communications networks.

And yet another object of the invention is to detect and alert operating personnel of equipment malfunction and signal deterioration as a result of interference and jamming.

SUMMARY

Briefly, the foregoing and other objects of the invention are achieved by recognizing that the random error rate of the entire digital data stream is the same as the random error rate of the single framing bit within each frame of a continuous digital data stream. Accordingly, the invention monitors and records the framing bit errors of a received digital communication signal, determines the framing bit error rate, sounds an audible alarm when the error rate exceeds a predetermined threshold, and displays the framing bit error rate and the total framing bit errors detected over a predetermined fixed time period. Furthermore, this information can be linked to a remote network monitor which, when desirable, may include a central computer for monitoring and displaying framing bit error rate.

BRIEF DESCRIPTION OF THE DRAWINGS

The following detailed description of the invention will be more readily understood when considered in conjunction with the accompanying drawings wherein.

DETAILED DESCRIPTION OF THE INVENTION

Figures 1, 2:
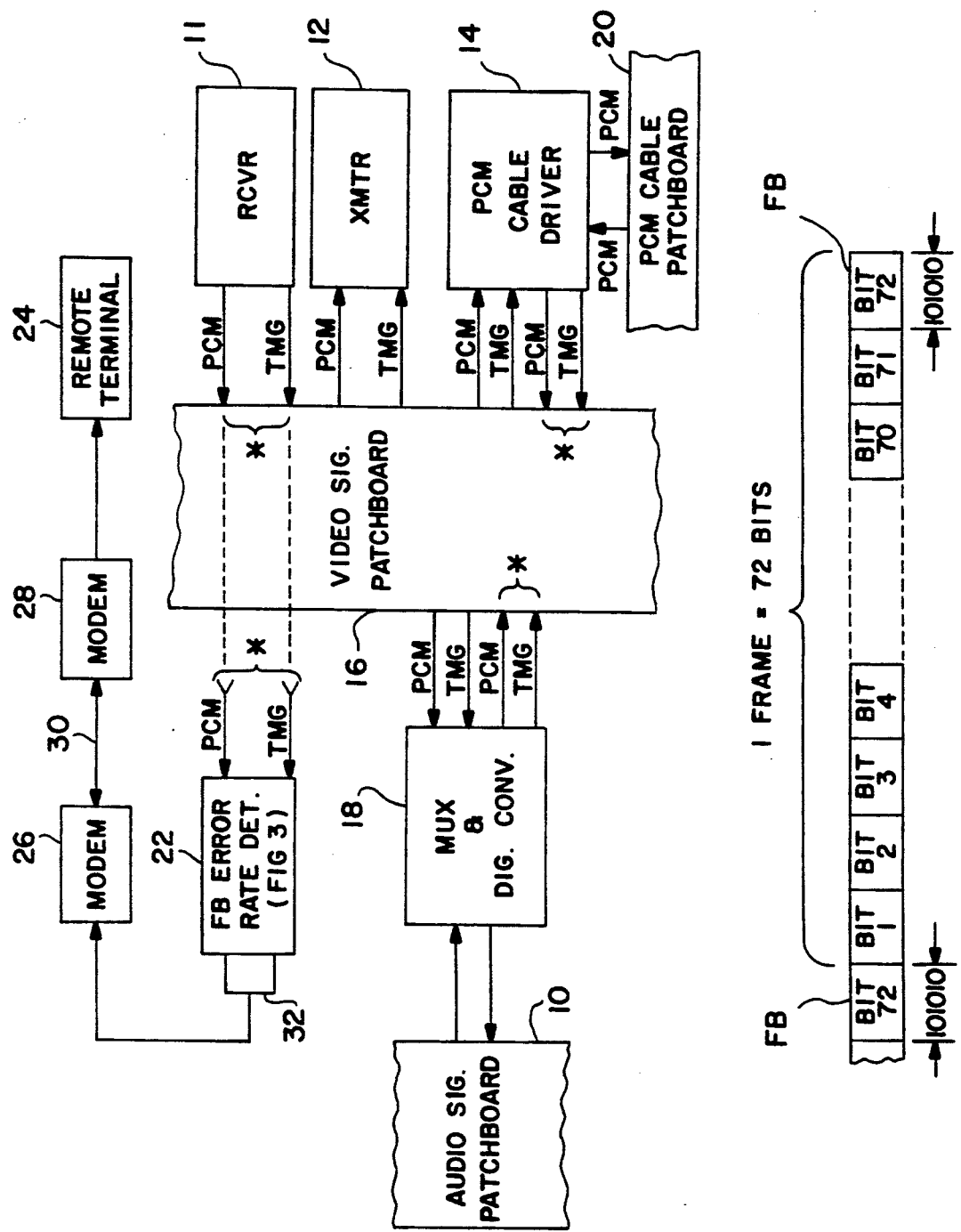
FIG. 1 is an electrical block diagram partially illustrative of a time division multiplex digital communication network utilizing the subject invention.
FIG. 2 is a diagram illustrative of a continuous digital data stream divided into frames.

Referring now to the drawings and more particularly to FIG. 1, shown thereat is a portion of a multi-channel digital communications system having a time division multiplex capability used, for example, in a network communication system. Shown thereat is an analog audio signal patchboard 10 which is adapted to be coupled to either a radio-receiver combination shown by reference numerals 11 and 12, or a cable driver unit 14 through a digital (video) signal patchboard apparatus 16 and a time division multiplexer (MVX) and digital converter 18. The driver unit 14 in turn couples to cable patchboard apparatus 20. Information in the form of data is communicated between the system components in a well known pulse coded modulation (PCM) format in a continuous digital stream of 1's and 0's divided into groups which are known as frames. In order to synchronize the data stream and indicate the beginning of the data frames so as to provide a timing reference for reading data, a timing (TMG) pulse is transmitted and received along with the PCM data stream. This is indicated by the respective PCM and TMG signal lines connected to and from the video signal patchboard 16 and the digital communications apparatus 11, 12, 14 and 18.

As shown in FIG. 2, each frame of the continuous digital data stream is 72 bits long and consisting of 71 data bits, i.e. bits 1, 2, 3 ... 70, 71 and one framing bit (FB) which is defined as the last bit, i.e. bit 72. The framing bit of each frame always has the same predefined digital pattern of, for example, 1,0,1,0,1,0. This pattern will repeatedly appear every 72 bits unless there are errors in the data stream. The purpose of the framing bit is to provide a marker in the data stream so that electronic hardware can identify the location of the frames. It is necessary for the communications hardware to know where the beginning of a frame is because positional data within the frame must be detected in order to properly operate on the information contained in the frame bits.

This now leads to a consideration of the subject invention, which is directed to a method and apparatus for monitoring the digital data stream present, for example, at various points on the patchboard 16 without interruption or interference to the communications channels in place and operating in a PCM network. The invention, moreover, is based upon the following principle, which has been observed in actual practice and which is: The random error rate of the framing bit, defined as the last bit, within each frame of a continuous digital data stream, is the same as the random error rate of the entire digital data stream itself.

Figure 3:
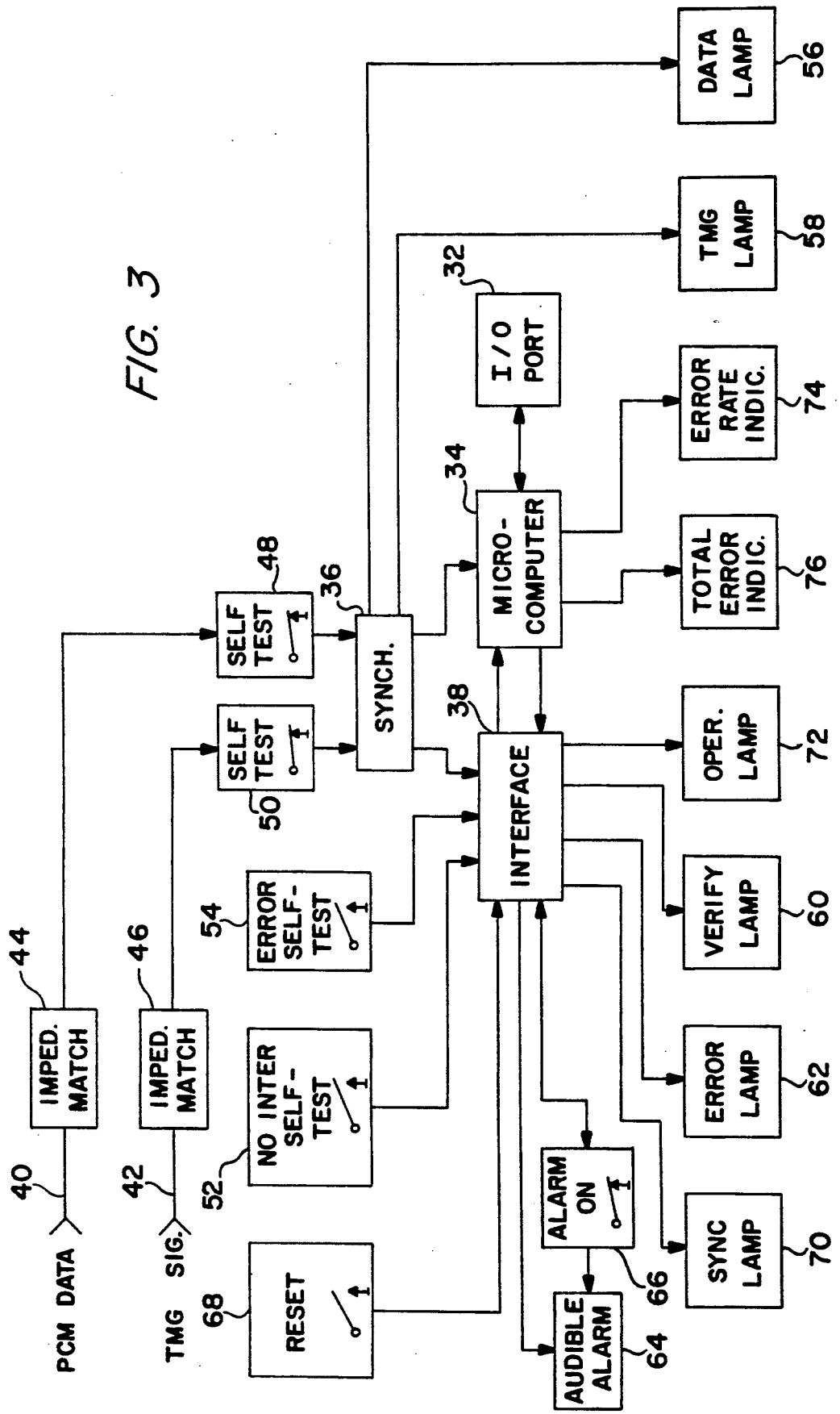
FIG. 3 is an electrical block diagram illustrative of hardware for implementing the subject invention.

Accordingly, and as shown in FIG. 1, a framing bit error rate detector and monitor apparatus 22, the details of which are shown in FIG. 3, is coupled, for example, to a PCM data signal line and a timing signal line at the output of the receiver 11. Alternatively, the FB apparatus 22 can be connected to the output of the multiplexer and digital converter 18 or the PCM cable driver 14. Coupling thereto is typically made via a BNC tee connector, not shown. This type of connection, however, is well known to those skilled in the art.

The apparatus 22 operates to continuously monitor, measure, calculate and display the error rate of the framing bit. It does not actually measure the error rate of the entire data stream. Since the length of each frame for a multichannel communication signal is 72 bits, i.e. 71 data bits and one framing bit, the frequency of the framing bit is 8 KHz and its wave shape after signal conditioning within the detector is a square wave with a 1,0,1,0,1,0 pattern. If there are errors in the framing bit, the pattern will be different, e.g. 1,0,0,1,1,0.

The framing bit error rate detector and monitor 22 apparatus is shown in FIG. 3 and is adapted to be utilized locally so that an operator can measure performance and trouble shoot malfunctions of the system using equipment which is both portable and non-intrusive and can be connected to a remote monitor 24 through a pair of modems 26 and 28 and a telephone line 30. The connection to the modem 26 is through a digital input/output port 32.

Referring now to FIG. 3, the framing bit error rate detector and monitor 22 shown thereat comprises a continuous on-line error rate detector including, inter alia, a microcomputer unit 34, a synchronizer 36, and an interface unit 38. The microcomputer 34 is adapted to operate on the framing bit included in a PCM data signal applied to circuit lead 40 while the synchronizer 36 operates to identify the framing bit in response to a timing signal (TMG) applied to circuit lead 42. Both the PCM data signal and the TMG signal are coupled to the synchronizer 36 via respective impedance matching networks and self-test switch devices 48 and 50 shown comprising normally closed switches and which may be manually operated by an individual operating the apparatus 22.

The synchronizer 36, moreover, typically comprises a commercially available device, such as a Model No. 220-805157-XXX synchronizer circuit card available from the Canadian Marconi Company. The microcomputer unit 34, on the other hand, is comprised of a commercially available microcomputer circuit card available from the Motorola Company and identified as Part No. M68HC11EVB. The interface unit 38, on the other hand, comprises a simple interconnect circuit card. The details of this element can be easily designed by any skilled circuit designer without undue experimentation. Additionally, the interface unit 38 is connected to two other self-test switches 52 and 54.

The self-test switch 48 provides a means for interrupting the input data for a period greater than 20 milliseconds, causing a DATA lamp 56 to be energized. In a like manner, the self-test switch 50 is adapted to interrupt the timing signal for a period greater than 20 milliseconds, which in turn causes a TMG lamp 58 to be energized. The energization of the self-test switch 52 operates to generate a condition in a microprocessor 34 of an INTERRUPT routine which is utilized to calculate framing bit errors, causing a VERIFY lamp 60 to light. The self-test switch 54 comprises an error self-test switch which is operable to simulate a condition of framing bit errors when it is actuated, causing an ERROR lamp 62 to light.

An audible alarm 64 is coupled to the interface 38 as well as through a normally closed ALARM ON switch 66 and has for its purpose providing the operator with an audible alarm with two different duty cycles when predetermined FB error rates are detected. The switch 66 enables the alarm to be quieted on demand. A RESET switch 68 shown as a normally open switch is also coupled to the interface 38 and provides a means to manually clear all lamps, indicators and alarms and to initiate a measurement cycle by the operator.

Further, two indicator lamps, a SYNC lamp 70 and an OPERATIONAL lamp 72 which respectively provide a visual indication when an out of sync condition exists and when the system is in an accepted operational state. Two numerical indicators, an ERROR RATE indicator 74 and a TOTAL error indicator 76 are also shown coupled to the microcomputer 34 and provide an indication of framing bit error rate and total framing bit errors detected by the instrument since the last manual activation of the reset switch 68.

Figure 4:
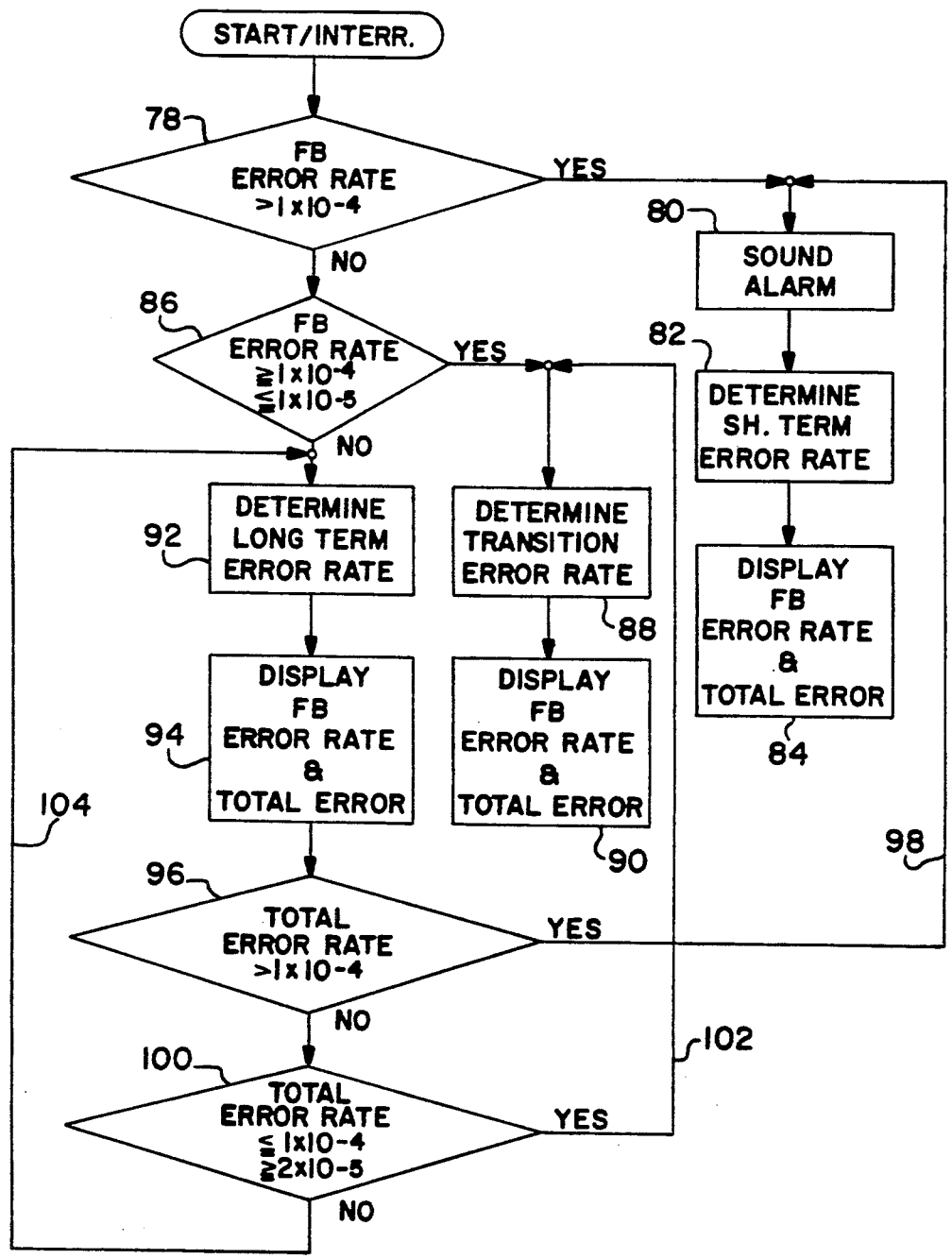
FIG. 4 is a flow chart generally illustrative of the inventive method implemented in the software of the apparatus shown in FIG. 3.

This now leads to a consideration of the operation of the embodiment shown in FIG. 3 and which is partially illustrated by the flow chart in FIG. 4 inasmuch as it is software driven. In practical applications, the error rate will not be steady over short periods of time. Instead, the errors in the data stream will be received and sensed in bursts. Therefore, the error rate can repeatedly change in a rapid non-repetitive sequence with a range of extreme error rate values from $1 \times 10^{-1}$ to $1 \times 10^{-9}$ meaning that one in a hundred to one in a billion data bit errors occur. The apparatus in accordance with the subject invention is able to respond to short term high error rate bursts as well as long term low error rate conditions. It is to be noted that the apparatus of the subject invention only operates on the framing bit FB (FIG. 2), it being assumed that whatever affects the entire continuous digital data stream also affects the FB in the same way.

By definition, the framing bit error rate, hereinafter referred to as the FB error rate, is simply the ratio of FB errors received divided by the total FB's received during a given time period. The problem which presents itself is this. How many FB's must be received before performing an error rate calculation? If the instantaneous FB error rate is varying rapidly in a non-periodic fashion, what FB error rate is used as a criteria for determining when the FB error rate has exceeded a predetermined threshold, for example, $1 \times 10^{-4}$ meaning that one data bit error occurs every 10,000 data bits. Furthermore, what FB error rate should be displayed?

The first priority of this invention, therefore, is to detect when the FB error rate exceeds a $1 \times 10^{-4}$ threshold, and activate the alarm 64 (FIG. 3) to warn the operator so that appropriate action may be initiated, if required. This threshold may be exceeded only once, for example, by a short burst of FB errors due to an aircraft flying through the radio beam or it may be exceeded periodically by the rise of the morning sun shining directly but briefly into the communications antenna, or it may be exceeded due to a true equipment malfunction. What is significant, however, is that the operator will receive a warning that some type of a disturbance has occurred. The method of this invention, therefore divides the problem of detecting FB errors into three categories, and accordingly operates in three calculation modes, namely: a short term mode where the FB error rate is greater than $1 \times 10^{-4}$; a transition mode where the FB error rate is equal to or less than $1 \times 10^{-4}$, but equal to or greater than $2 \times 10^{-5}$; and a long term mode where the FB error rate is equal to or less than $1 \times 10^{-5}$.

Accordingly, the microcomputer 34 includes a stored computer program which automatically determines which of the three modes is appropriate depending upon the FB errors detected and thereafter determines the FB error rate. The computer software is fully automatic and is able to recognize changes in the FB error rate and adjust automatically to the proper mode without manual intervention such as a manual reset by activation of the switch 68.

With respect to computation time, it was noted above that the frequency of the framing bit is typically 8 KHz, meaning that an FB must be processed every 125 microseconds. To insure that each framing bit is processed in a timely manner, a real time INTERRUPT routine is included in the computer program stored in the microprocessor 34 to perform this task. Accordingly, every 125 microseconds, the microprocessor 34 is interrupted and the framing bit is checked for error. The INTERRUPT routine performs the following operations: (1) synchronize the TMG signal with the 1,0,1,0,1,0 pattern of the framing bit; (2) detect and count the FB errors that occur in this pattern for each measurement cycle; (3) compare the total FB count for each measurement cycle against the number 11 which is the threshold number of FB errors for the short term mode threshold of $1 \times 10^{-4}$ over a 100,000 FB measurement cycle or time period; (4) set software flags when FB error count of 11 is reached; (5) display the total FB errors received since the last "reset" of the instrument on the total error indicator 76; (6) activate the error lamp 62 when 11 FB errors are received; (7) position software pointers; and (8) reset software flags, pointers, indicators and counters when a measurement cycle is complete.

When the software is not processing framing bits during the INTERRUPT routine, it is performing the following operations in its MAIN program: (1) polling fault detection inputs within the apparatus 22 and sounding an alarm via the audible alarm 64 with visual indication when these faults are detected; (2) sounding an alarm via the audible alarm 64 to alert the operator when the FB error rate has exceeded $1 \times 10^{-4}$; (3) controlling the duty cycle, i.e. the on-off time of the alarm 64; (4) controlling the indicator lamps 72, 60 or 62 to indicate operation, verify, or error conditions, respectively; (5) calculating FB error rate by one of three methods to be described hereinafter, depending upon the mode of the FB error rate; (6) displaying via the error rate indicator 74 the FB error rate; and (7) providing an FB error rate message to remote terminals via the I/O port 32.

As alluded to briefly above, the polled fault detection inputs within the apparatus 22 include: (1) no DATA present; (2) no TMG present; (3) no synchronization with TMG; and (4) no internal INTERRUPT present.

With respect to the operation of the audible alarm 64, the sound generated thereby provides an audible indication of the type of operating condition detected. For example, the alarm 64 is turned on continuously when a signal input fault or internal fault is sensed. The alarm 64 is thereafter turned off when the fault is corrected. Additionally, the alarm 64 is pulsed with a 2 sec. ON, 10 sec. OFF duty cycle when the FB error rate threshold of $1 \times 10^{-4}$ has been exceeded. The alarm duty cycle, however, changes to a 0.5 sec. ON, 0.5 sec. OFF pattern when the FB error rate of $1 \times 10^{-3}$ has been exceeded to add emphasis that the FB error rate is in this range.

The alarm switch 66 is also coupled with stored software in the microprocessor 34 to not only silence the alarm 64 after a fault condition or FB error rate threshold condition has been detected, but any attempt to defeat the alarm by using the switch 66 before any of the aforementioned alarm conditions have been detected, cause the audible alarm to be sounded continuously. Finally, if the alarm switch 66 is left in the defeated position after the fault or communication problem has been corrected, however, this condition will also be detected by the software and the alarm will be activated continuously until the defeat condition is removed by the switch 66.

The framing bit error rate criteria of utilizing a measurement cycle of 100,000 FB's has been determined experimentally, with the decision being based on a tradeoff between (a) the minimum number of FB errors necessary to test for a condition where the FB error rate threshold of $1 \times 10^{-4}$ has been exceeded and (b) the time required to collect these FB errors. Using a measurement cycle of 100,000 FB's and an FB error rate threshold of $1 \times 10^{-4}$, means that only 10 FB errors can be received during any measurement cycle. Since the framing bit frequency is 8 KHz, a measurement cycle of 100,000 FB's requires 12.5 seconds to complete, providing 11 FB errors are not received first in which case the FB error rate threshold of $1 \times 10^{-4}$ has been exceeded and a new measurement cycle will be initiated with the previous FB errors erased. Test data indicated that a $1 \times 10^{-4}$ FB error rate and a measurement cycle of 100,000 FB's resulted in an average of 10 FB errors within a standard deviation of approximately 2 and a range of 5 to 15. This meant that false detections would start to occur at FB error rates greater than $5 \times 10^{-5}$. In each measurement cycle, it was necessary to bound both the threshold FB errors received as well as the total FB errors received in a measurement cycle to prevent the apparatus from locking up in a mode and not adjusting automatically to FB error rate changes.

As mentioned briefly above, the stored computer program in the microcomputer 34 calculates FB error rates by one of three different methods or modes now to be described, and which includes: (1) a Short Term mode; (2) a Transition mode; and (3) a Long Term mode. The mode utilized is determined by the number of FB errors received during a particular measurement cycle.

Consider now the Short Term mode where the FB error rate is defined to be greater than $1 \times 10^{-4}$. In this mode the FB error rate determination is based on one measurement cycle of 100,000 FB's and an FB error threshold of 10 FB errors. If the FB error threshold is exceeded, i.e. 11 FB errors are received prior to 100,000 FB's are received, the FB error rate threshold of $1 \times 10^{-4}$ has been exceeded. As indicated in FIG. 4 by reference numeral 78, when this occurs the alarm 64 is sounded as shown by step 80, whereupon a new measurement cycle will immediately be initiated and the FB error rate is calculated as shown by step 82. The FB error rate is next calculated by a table look up method which is well known in the art of computer science. A pointer for this table is positioned each time the IN- TERRUPT routine is completed which is once every 125 microseconds. The table look up method is utilized rather than a mathematical division calculation because the computation time required to continually calculate the average instantaneous FB error rate using a division calculation would require extensive data storage capacity and sorting of measurement cycles of different lengths, since a measurement cycle ends when 11 FB errors are detected and therefore these reduced measurement cycles are a portion of the normal 100,000 FB measurement time period. The FB error rate derived from the look-up table method comprises an instantaneous value. An average value, however, is required. Since the measurement cycles may have a wide variance in the short term mode, division or normal average techniques would tend to distort the value and therefore a method is required to calculate a more average instantaneous value for the final displayed FB error rate which is shown by step 84 in FIG. 4.

The following technique for averaging or smoothing the FB error rate is utilized. As each new FB error rate is determined from the look up table included in the software of the microcomputer 34, the previous value is saved. When two consecutive FB error rate values are the same, this value is considered the average instantaneous FB error rate and this average value is displayed by the ERROR RATE indicator 74 as shown by step 84 in FIG. 4. The two consecutive values are constantly updated and compared. Whenever two consecutive values in a series of error rate values are the same, but yet different than a previous comparison value in the series, it is assumed that the FB error rate has changed and the new comparison value of FB error rate is determined and displayed. This technique involves only a comparison; however, it provides a very fast and accurate indication.

The next mode comprises the Transition mode and is entered where the FB error rate is equal to or less than $1 \times 10^{-4}$ but equal to or greater than $2 \times 10^{-5}$. In this mode the FB error rate determination is based on the combined total of FB errors measured in two consecutive measurement cycles of 100,000 FB's. If the combined total of FB errors measured in two consecutive cycles is equal to or greater than 3 but equal to or less than 20, the FB error rate calculation is performed for the Transition mode. There is no FB error threshold for sounding an alarm in this mode. Again, a table look up method is used to determine the FB error rate as shown by step 88 in FIG. 4; however, it is based on two tables included in the software of the microprocessor 34 due to the fact that two measurement cycles are utilized. Following a determination of the error rate, it is also displayed by the ERROR RATE indicator as shown by step 90.

When the FB error is measured and the two consecutive measurement cycles is equal to or less than 2, the error rate is shifted to the Long Term mode. In the Long Term mode, the error rate is defined to be equal to or less than $1 \times 10^{-5}$. In this mode, the FB error rate determination is based on the combined total of FB errors measured in an unlimited number of consecutive accumulating measurement cycles of 100,000 FB's each and it is designated by reference numeral 92. At the end of the first measurement cycle, for example, the FB error rate is based on the FB errors measured during the first cycle, while at the end of 100 consecutive measurement cycles, the FB error rate is based on the FB errors measured during the entire 100 measurement cycles. In this mode, all the measurement cycles are the same, i.e. 100,000 FB's each. A mathematical division operation, therefore, is used to calculate the FB error rate in this mode. Also, the long term FB error rate and total errors are displayed as shown by reference numeral 94.

As the value of the FB errors for each new measurement cycle is accumulated for computation in the Long Term mode, each value is checked to determine first, does it equal 11, meaning that the error rate is greater than $1 \times 10^{-4}$ as shown at 96 because this causes an immediate shift back to the Short Term mode 82 as shown by lead line 98, with all the long term mode counters and data being reset. On the other hand, if the combined total of FB errors measured in the previous two measurement cycles is greater than 2, meaning that the error rate is equal to or less than $1 \times 10^{-4}$ equal to and greater than $2 \times 10^{-5}$, a mode shift back to the Transition mode 88 is made as depicted by lead line 102, with all the long term mode counters and data being reset. Finally, if the FB error rate is outside of the range, as depicted by reference numeral 100, the Long Term mode will continually repeat, as depicted by lead line 104.

Thus what has been shown and described is a method and apparatus for monitoring the random error rate of a digital data stream in a time division multiplex, multichannel communications system and which can be placed in a continuous on-line condition to measure and trouble shoot a multi-channel digital network without interruption or interference to the channels and without sacrificing channel capacity.

Having thus shown and described what is considered to be the preferred method and embodiment for implementing the subject invention, it is to be noted that the same has been made by way of illustration and not limitation. Accordingly, all modifications, alterations and changes coming within the spirit and scope of the invention are herein meant to be included.

We claim:

1. A method for determining the data bit error rate in a continuous digital stream divided into a plurality of data bit frames having one bit defined as a framing bit and consisting of a predetermined binary pattern which is identical for each framing bit when error free, comprising the steps of:
   (a) detecting errors in the framing bit for a measurement cycle having a predetermined maximum time period;
   (b) determining the framing bit error rate of the errors detected in at least one error rate calculating mode in response to the number of framing bit errors detected within said measurement cycle, said at least one error rate calculating mode comprising a plurality of modes including a first mode which is initiated when a first quantity of framing bit errors is detected, a second mode which is initiated when a second quantity of framing bit errors is detected, said second quantity being less than said first quantity and equal to or greater than a third quantity of detected framing bit errors, and a third mode which is initiated when a quantity of framing errors is detected which is equal to or less than a fourth quantity of framing bit errors, said fourth quantity being less than said third quantity;
   (c) generating an alarm signal when the framing bit error rate exceeds a predetermined value; and
   (d) displaying the value of said framing bit error rate, said first mode comprising a short term mode including the steps of calculating the framing bit error rate for one said measurement cycle, and thereafter proceeding to step (c) only when said predetermined value is exceeded, said step of calculating the framing bit error rate for one said measurement cycle additionally including the step of comparing a quantity of framing bit errors detected in two consecutive said measurement cycles, and thereafter proceeding to step (d) when two consecutive quantities of detected framing bit errors are substantially the same.

* * * * *